United States Patent
Park

(10) Patent No.: US 7,637,116 B2
(45) Date of Patent: Dec. 29, 2009

(54) STEPPING MOTOR VALVE FOR A REFRIGERATOR

(75) Inventor: Jin Su Park, Changwon-si (KR)

(73) Assignee: LG Electronics Inc., Seoul (KR)

( * ) Notice: Subject to any disclaimer, the term of this patent is extended or adjusted under 35 U.S.C. 154(b) by 635 days.

(21) Appl. No.: 11/042,177

(22) Filed: Jan. 26, 2005

(65) Prior Publication Data
US 2005/0167626 A1 Aug. 4, 2005

(30) Foreign Application Priority Data
Jan. 30, 2004 (KR) .................. 10-2004-0006320

(51) Int. Cl.
*F25B 41/04* (2006.01)
*F16K 31/12* (2006.01)
*F16K 11/074* (2006.01)
(52) U.S. Cl. .................. 62/222; 251/12; 137/625.46
(58) Field of Classification Search .................. 62/222, 62/117, 228.1; 137/625.46, 625.31, 625.41; 251/129.12, 129.11, 208; 165/296
See application file for complete search history.

(56) References Cited

U.S. PATENT DOCUMENTS

| 4,899,073 | A | * | 2/1990 | Takeuchi et al. | ............ 310/116 |
| 6,672,089 | B2 | | 1/2004 | Park et al. | ..................... 62/199 |
| 2002/0148241 | A1 | * | 10/2002 | Kaneko et al. | ................. 62/199 |

* cited by examiner

Primary Examiner—Chen-Wen Jiang
(74) Attorney, Agent, or Firm—Ked & Associates, LLP

(57) ABSTRACT

A stepping motor valve is provided for a refrigerator. The stepping motor valve includes a catching part and a valve body provided at an outer rim portion and a central portion of a bottom surface of a rotator of a stepping motor, respectively. A valve housing and a port support are installed below the stepping motor, and a protrusion is provided on a top surface of the port support. An input port and first and second output ports are provided penetrating through the port support and the protrusion, respectively. Meanwhile, a wire, which protrudes from the interior of the port support and is wrapped around the side surface of the protrusion, is bent at one end thereof in the form of a hook to form a stopper. The stopper formed out of the wire is prevented from being worn, thereby ensuring the operational reliability of the product.

8 Claims, 4 Drawing Sheets

STEPPING MOTOR VALVE FOR A REFRIGERATOR

BACKGROUND OF THE INVENTION

1. Field of the Invention

The present invention relates to a stepping motor valve for a refrigerator, and more particularly, to a stopper structure of a stepping motor constituting a stepping motor valve.

2. Description of the Related Art

Generally, refrigerating apparatuses, such as refrigerators, air conditioners and kimchi refrigerators, control temperature therein by using refrigerants of high temperature and pressure that circulate in refrigerating cycles. Among the refrigerating apparatuses, a refrigerator will be described herein by way of example.

FIG. 1 shows a refrigerating cycle of a conventional refrigerator.

As shown in the figure, the refrigerating cycle comprises a compressor 11 for compressing a refrigerant, a condenser 13 for radiating heat contained in the refrigerant compressed by the compressor 11, and a dryer 15 installed at a rear end of the condenser 13 to remove moisture remaining in the refrigerant.

Further, refrigerant lines are provided between an outlet of the dryer 15 and inlets of a plurality of expansion valves 21 and 23 connected to the outlet. A three-way stepping motor valve 17 is also installed to connect a refrigerant line 19c on the side of the outlet of the dryer 15 to refrigerant lines 19a and 19b on the sides of the inlets of the expansion valves 21 and 23.

The stepping motor valve 17 is constructed to selectively open or close the refrigerant lines 19a and 19b connected to the expansion valves 21 and 23 under control of a microcomputer (not shown). That is, with the stepping motor valve 17, it is possible to open or close the refrigerant line 19a connected to the expansion valve 21, the refrigerant line 19b connected to the expansion valve 23, or both the refrigerant lines 19a and 19b, by selectively opening or closing the refrigerant lines 19a and 19b connected to the expansion valves 21 and 23, respectively, with respect to the inlets thereof connected to the dryer 15.

Evaporators 25 and 27 are connected to rear ends of the expansion devices 21 and 23, respectively. The evaporators 25 and 27 generate cold air for cooling foodstuffs stored in the refrigerator. Refrigerant lines connected to the rear ends of the evaporators 25 and 27 are connected to the compressor 11, so that the refrigerating cycle, which is composed of compressor 11→condenser 13→dryer 15→stepping motor valve 17→expansion devices 21 and 23→evaporators 25 and 27→compressor 11, is formed.

Therefore, in the case where there are the plurality of evaporators 25 and 27, it is possible to control supply of cold air according to the storage space of the refrigerator. That is, according to the operation for opening the stepping motor valve 17, it is possible to construct a refrigerating cycle composed of compressor 11→condenser 13→dryer 15→stepping motor valve 17→expansion device 21→evaporator 25→compressor 11, a refrigerating cycle composed of compressor 11→condenser 13→dryer 15→stepping motor valve 17→expansion device 23→evaporator 27→compressor 11, or a refrigerating cycle composed of compressor 11→condenser 13→dryer 15→stepping motor valve 17→expansion devices 21 and 23→evaporators 25 and 27→compressor 11.

In other words, the refrigerant line 19a connected to the stepping motor valve 17, the expansion valve 21 and the evaporator 25 are components for controlling cold air in a first storage space. The refrigerant line 19b connected to the stepping motor valve 17, the expansion valve 23 and the evaporator 27 are described as components for controlling cold air in a second storage space.

Meanwhile, FIG. 2 shows the structure of the stepping motor valve shown in FIG. 1, and FIG. 3 shows a cross section taken along line A-A' of FIG. 2.

As shown in these figures, the three-way stepping motor valve 17 has a stepping motor 30 comprising a stator 31 and a rotator 33. A portion of a rim of a bottom surface of the rotator 33 protrudes downward to form a catching part 34, and a valve body 35 is provided at a central portion of the bottom surface of the rotator 33.

An opening area 36 is formed at a portion of a bottom surface of the valve body and a closing area 37 is formed at the remaining portion thereof. The opening area 36 functions to open first and second output ports 47 and 49 to be described later, and the closing area 37 functions to close the first and second output ports 47 and 49.

Further, a valve housing 39 is provided below the stepping motor 30, and a port support 41 is installed within the valve housing 39. A top surface of the port support 41 is provided with a protrusion 43 of which a top surface comes into close contact with the bottom surface of the valve body 35, and an input port 45 is provided to penetrate the top surface of the port support 41. The first and second output ports 47 and 49 are provided to penetrate a portion of the top surface of the protrusion 43.

The input port 45 functions to supply the refrigerant into the valve housing 39, and the first and second output ports 47 and 49 function to discharge the refrigerant that has been supplied through the input port 45 into the valve housing 39. At this time, for example, the first and second output ports 47 and 49 can communicate with the refrigerant lines 19a and 19b shown in FIG. 1, respectively.

Meanwhile, a stopper 51 is formed at a portion of the top surface of the port support 41, which corresponds to the outside of the protrusion 43. The stopper 51 is made of a rubber material and functions to cause the microcomputer to sense the position of the rotator 33 at an initial control stage. That is, if a refrigerator is first operated after coming onto the market, the stepping motor valve 30 is controlled with respect to a position where one side of the catching part 34 comes into contact with one side of the stopper 51 as the rotator 33 rotates in one direction.

Reference numeral A1 that has not yet been described is a rotation axis about which the rotator 31 rotates.

However, the conventional stepping motor valve constructed as above has the following problem.

As described above, the stopper 51 is made of the rubber material, and the catching part 34 that comes into contact with the stopper 51 for the purpose of the initial control of the stepping motor valve 30 is formed integrally with the rotator 33 made of a relatively rigid material such as a magnet. Thus, if the catching part 34 collides against the stopper 51 many times due to frequent initial control operations of the stepping motor 30 or deviations in its operation, the stopper 51 may be worn, resulting in malfunction of the stepping motor 30.

SUMMARY OF THE INVENTION

Accordingly, the present invention is conceived to solve the problems in the prior art. An object of the present invention is to provide a stepping motor valve, wherein the durability of a stopper is improved by changing the material thereof so that the stopper cannot be easily worn, and consequently, a catching part comes into contact with the stopper at a correct position, thereby enabling accurate position control as well as ensuring the reliability of operation of a stepping motor.

According to the present invention for achieving the object, there is provided a stepping motor valve for a refrigerator, including a stepping motor with a stator and a rotator, a valve body with an opening area and a closing area for controlling flow of a refrigerant while being rotated by the rotator, and a port support with an input port and a plurality of output ports, the input and output ports being opened and closed by the opening and closing areas, comprising a catching part provided at one side of a bottom surface of the rotator; and a metallic stopper with which the catching part comes into contact by means of the rotation of the rotator upon initial control of the stepping motor valve.

The stopper may be formed out of a wire that is partially press-fitted into and fixed to the port support.

The stopper may be made in the form of a hook that is parallel to a top surface of the port support and has a predetermined width in a fore and aft direction.

With the stepping motor valve for a refrigerator according to the present invention, since the stopper is made of a metallic material, there is an advantage in that it is possible to prevent the occurrence of a phenomenon in which the stopper is worn during its operation.

BRIEF DESCRIPTION OF THE DRAWINGS

The above and other objects, features and advantages of the present invention will become apparent from the following description of a preferred embodiment given in conjunction with the accompanying drawings, in which.

DESCRIPTION OF THE PREFERRED EMBODIMENT

Hereinafter, a preferred embodiment of the present invention will be described in detail with reference to the accompanying drawings.

Figure 4:
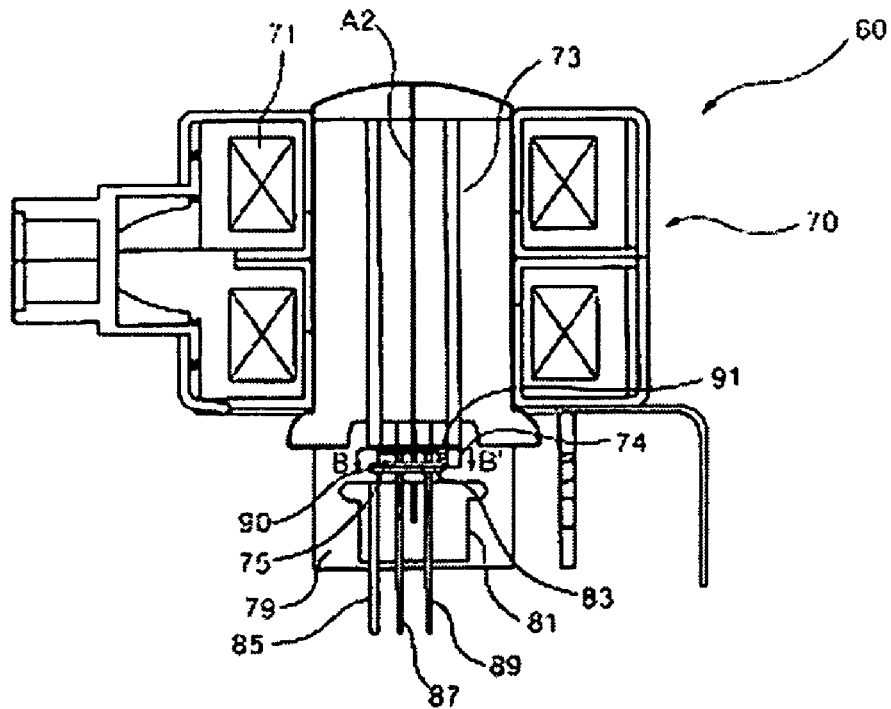
FIG. 4 is a sectional side view showing the structure of a stepping motor valve according to a preferred embodiment of the present invention.
Figure 5:
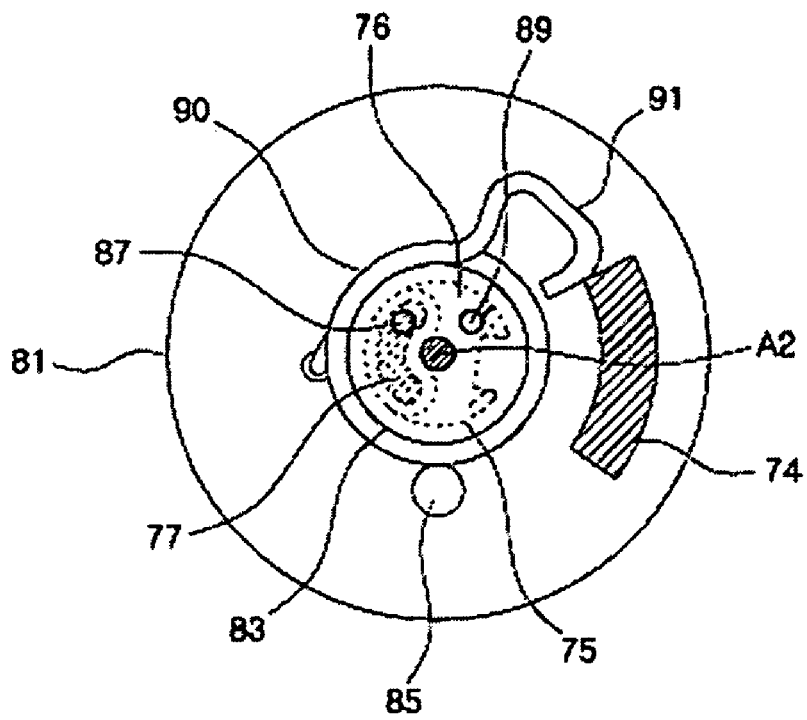
FIG. 5 is a cross sectional view taken along line B-B' of FIG. 4.

FIG. 4 shows a stepping motor valve for a refrigerator according to a preferred embodiment of the present invention, and FIG. 5 shows a cross section taken along line B-B' of FIG. 4.

As shown in these figures, a stepping motor 70 constituting a stepping motor valve 60 comprises a stator 71 and a rotator 73. The rotator 73 rotates about a rotation axis A2 by means of electromagnetic cooperation thereof with the stator 71. A catching part 74 is formed on a bottom surface of the rotator 73, and a valve body 75 is provided at the center of the bottom surface of the rotator 73.

The catching part 74 is formed in such a manner that a portion of an outer rim of the bottom surface of the rotator 73 protrudes downward. The catching part 74 comes into contact with a stopper 91, which will be described later, at an initial control stage for the stepping motor valve 60. Further, the valve body 70 is formed with an opening area 76 and a closing area 77 for opening and closing first and second output ports 87 and 89 to be described later.

Meanwhile, a valve housing 79 is provided below the stepping motor 70. The interior of the valve housing 79 is formed with a predetermined space in which cold air can stay, and a port support 81 is installed in the inner space of the valve housing 79. The port support 81 is to support a plurality of ports for input and output of the cold air. A top surface of the port support 81 is provided with a protrusion 83 that comes into close contact with a bottom surface of the valve body 75.

The port support 81 is provided with an input port 85 and the first and second output ports 87 and 89 through which the interior and exterior of the valve housing 79 communicate with each other. The input port 85 is to supply a refrigerant to the inner space of the valve housing 79 and is provided to penetrate a portion of the top surface of the port support 81.

The first and second output ports 87 and 89 are to discharge the refrigerant that has been supplied through the input port 85 into the valve housing 79, and are provided to penetrate portions of the top surface of the protrusion 83. The first and second output ports 87 and 89 penetrate the portions of the top surface of the protrusion 83, which correspond to the valve body 75. The stopper 91 is formed at a portion of the top surface of the port support 81, which corresponds to the outside of the protrusion 83. The stopper 91 comes into contact with the catching part 74 to sense an initial position of the rotator 73 at the initial control stage for the stepping motor valve 60. The stopper 91 is formed out of a wire 90. One end of the wire 90 is press-fitted into and fixed to the interior of the port support 81, and the other end thereof is wrapped at least one time around the side surface of the protrusion 83.

Next, the end of the wire 90 is bent in the form of a hook to form the stopper 91. At this time, the stopper 91 is formed to be parallel to the top surface of the port support 81 and to have a predetermined width in a fore and aft direction. This is to determine a reference step upon initial control of the stepping motor valve 60. A detailed description thereof will be omitted herein.

Hereinafter, the operation of the stepping motor valve for a refrigerator according to the preferred embodiment of the present invention constructed as above will be described with reference to FIGS. 6 to 9.

The rotator 73 rotates through the electromagnetic cooperation between the stator 71 and the rotator 73 of the stepping motor 70. With the rotation of the rotator 73, the valve body 75 also rotates. With the rotation of the valve body 75, the first and second output ports 87 and 89 are selectively opened or closed.

Figure 1:
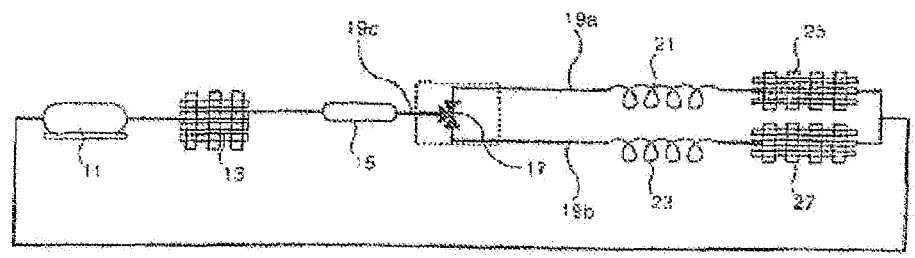
FIG. 1 is a view showing the configuration of a refrigerating cycle with a general stepping motor valve.
Figure 2:
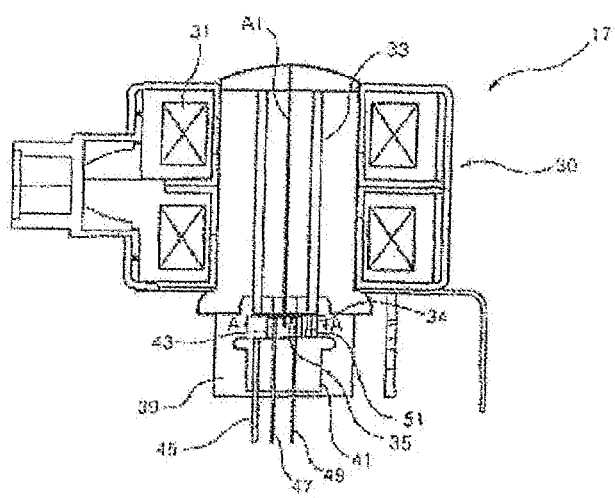
FIG. 2 is a sectional side view showing the structure of the stepping motor valve shown in FIG. 1.
Figure 3:
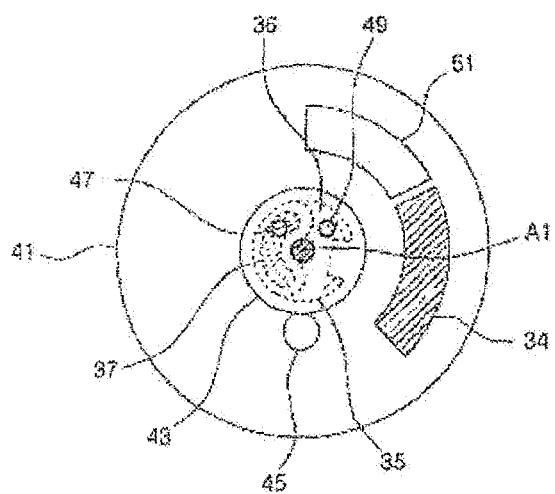
FIG. 3 is a cross sectional view taken along line A-A' of FIG. 2.
Figure 6:
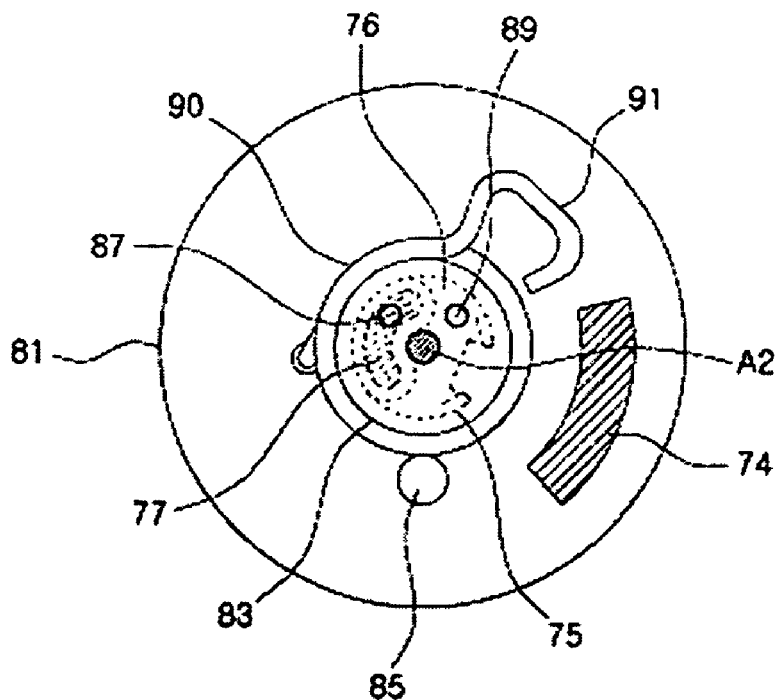
FIGS. 6 to 9 are views showing operational states of the stepping motor valve of the embodiment shown in FIG. 4.

First, as shown in FIG. 6, the first output port 87 is positioned in the closing area 77 of the valve body 75 and thus is in a closed state. Therefore, the refrigerant that has been supplied through the input port 85 into the inner space of the valve housing 79 is prevented from being transferred to the expansion device 21 (see FIG. 1) through the first output port 87.

However, the second output port 89 is positioned in the opening area 76 of the valve body 75 and thus in an opened state. Therefore, the refrigerant that has been supplied through the input port 85 into the inner space of the valve housing 79 is transferred to the expansion device 23 through the second output port 89.

Figure 7:
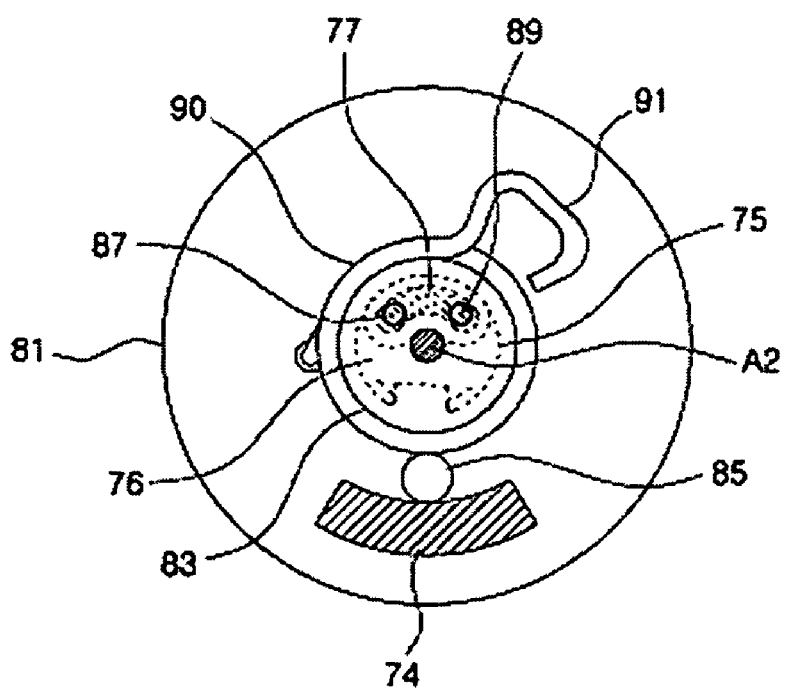

As shown in FIG. 7, when the rotator 73 rotates in one direction (in a clockwise direction in the figure), the second output port 89 is also positioned in the closed area 77 of the valve body 75. Thus, since the second output port 89 is also closed similarly to the first output port 87, the transfer of the refrigerant therethrough is shut off.

Figure 8:
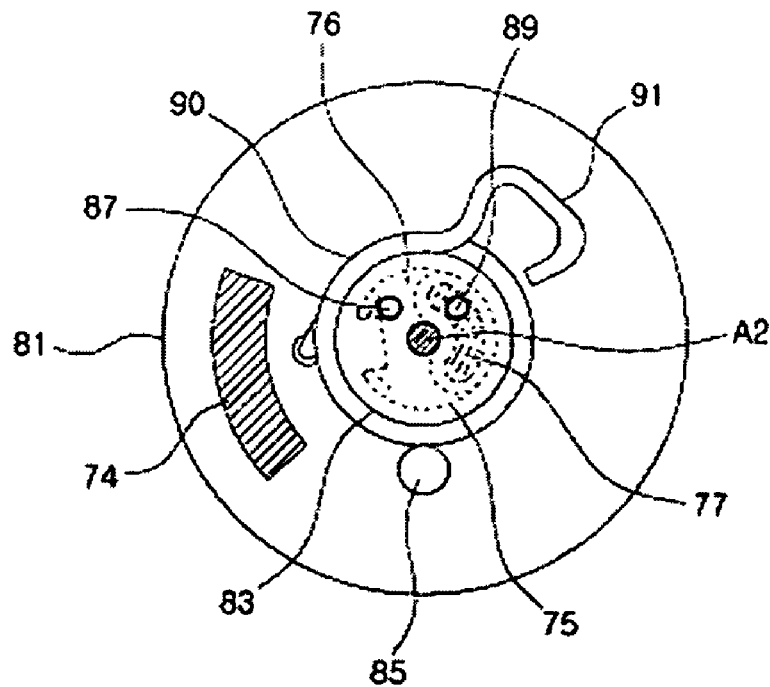

When the rotator 73 further rotates in the same direction, the first output port 87 is positioned in the opening area 76 of the valve body 75, as shown in FIG. 8. Therefore, the first output port 87 is opened to allow the refrigerant to be transferred to the expansion device therethrough.

Figure 9:
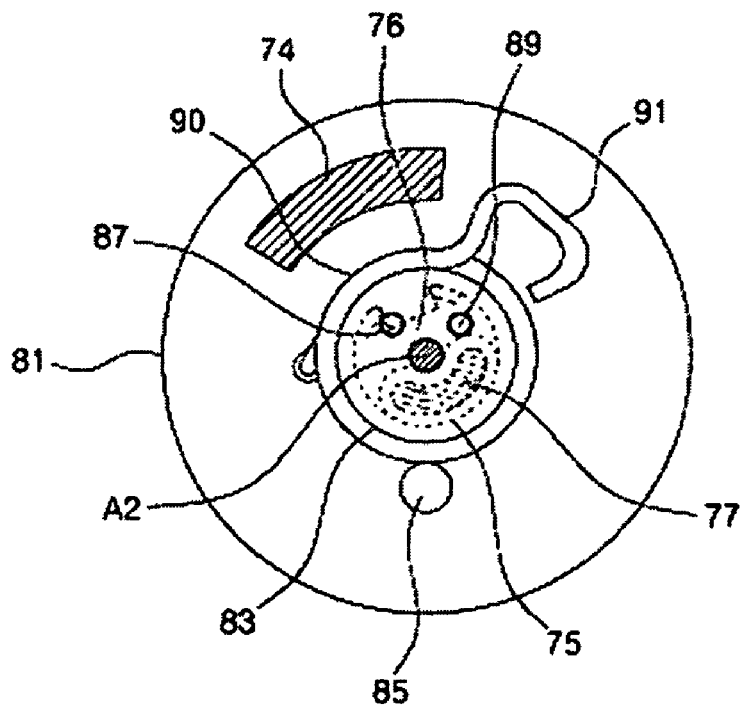

In such a state, when the rotator 73 further rotates in the same direction, the second output port 89 is positioned again in the opening area 76 of the valve body 75, as shown in FIG. 9. Therefore, since both the first and second output ports 87 and 89 are opened, the refrigerant is transferred to the expansion devices 21 and 23 through the first and second output ports 87 and 89.

Meanwhile, the rotator 73 rotates in an opposite direction (in a counterclockwise direction in the figure) in the state where the first and second output ports 87 and 89 are opened. Therefore, the opening and closing of the first and second output ports 87 and 89 described above are performed in reverse order. The rotation of the rotator 73 in the opposite direction is performed in a state where one end of the catching part 74 is spaced apart by predetermined steps from one end of the stopper 91.

When the rotator 73 further rotates in the opposite direction, the opening and closing of the first and second output ports 87 and 89 are repeated and both of them are then finally closed. Then, the rotator 73 stops in a state where the other end of the catching part 74 is spaced apart by predetermined steps from the other end of the stopper 91, and rotates again in the initial direction.

To cause the rotator 73 to rotate in one direction or an opposite direction as such, the current position of the rotator 73 should be recognized. To this end, the initial control is performed, wherein the rotator 73 rotates in one direction to the utmost so that one side of the catching part 74 comes into contact with one side of the stopper 91.

Then, the rotator 73 rotates in an opposite direction so that the other side of the catching part 74 comes into contact with the other side of the stopper 91. Accordingly, it is possible to know an allowable range of rotation of the rotator 73, and an initial position is set as the position of the rotator 73 in a state where the catching part 74 is in contact with the stopper 91.

The aforementioned initial control is performed in a case where a refrigerator is first operated after coming onto the market, or electric power is supplied back to a refrigerator after power failure or the like. Further, due to errors produced during the operation of a refrigerator, the rotator 73 may further rotate beyond a normal rotation angle so that the catching part 74 may come into contact with the stopper 91.

However, since the catching part 74 is formed integrally with the rotator 73 made of a rigid material and the stopper 91 is formed of the wire 90, even though the phenomenon of contact of the catching part 74 with the stopper 91 occurs many times, it is possible to prevent a conventional phenomenon in which the stopper 91 is damaged.

According to the present invention described above, it can be understood that the fundamental technical spirit of the present invention is that the stopper for the initial control of the stepping motor valve is formed out of a metallic material.

With the stepping motor valve for a refrigerator according to the present invention described above, the catching portion comes into contact with the stopper upon initial operation of the refrigerator so that the initial control position of the rotator can be correctly controlled. Since the stopper is formed out of a metallic material, durability thereof is improved. Thus, the phenomenon in which the stopper is worn can be prevented, resulting in improvement of the operational reliability of the product.

Further, since the stopper can be formed out of a wire, manufacture and assembly of the stepping motor valve can be simplified, thereby improving productivity.

Moreover, since the stopper is made in the form of a hook having a predetermined width in a fore and aft direction, it can absorb a shock produced when the catching part comes into contact with the stopper due to the rotation of the rotator. Thus, there is an advantage in that the life of the product can be prolonged.

It will be apparent that those skilled in the art can make other modifications within the fundamental technical spirit of the present invention. The scope of the present invention should be construed based on the appended claims.

What is claimed is:

1. A stepping motor valve for a refrigerator, the refrigerator including a stepping motor with a stator and a rotator, a valve body having an opening area and a closing area that control flow of a refrigerant while being rotated by the rotator, and a port support with an input port and a plurality of output ports, the input port and the plurality of output ports being opened and closed by the opening and closing areas, the stepping motor valve comprising:
a catching part provided at one side of a bottom surface of the rotator; and
a metallic stopper with which the catching part comes into contact by means of the rotation of the rotator upon initial control of the stepping motor valve, wherein the stopper is formed out of a wire, wherein the wire is press-fitted into and fixed to the port support.

2. The stepping motor valve as claimed in claim 1, wherein the stopper is made in the form of a hook, the hook being parallel to a top surface of the port support and having a predetermined width in a fore and aft direction.

3. The stepping motor valve as claimed in claim 1, wherein the stopper is made in the form of a hook.

4. The stepping motor valve as claimed in claim 3, wherein the hook is parallel to a top surface of the port support.

5. A valve for a refrigerator, comprising:
a stepping motor with a stator and a rotator;
a valve body coupled to the rotator and having an opening area and a closing area that control flow of a refrigerant while being rotated by the rotator;
a port support coupled to the stator and having an input port and a plurality of output ports, the input port and the plurality of output ports being opened and closed by the opening and closing areas;
a catching part provided at one side of a bottom surface of the rotator; and
a metallic wire stopper mounted on the port support such that the catching part comes into contact with the wire stopper during an initial control movement of the valve body, wherein the wire stopper is press-fitted into and fixed to the port support.

6. The valve for a refrigerator as claimed in claim 5, wherein the wire stopper is made in the form of a hook.

7. The valve for a refrigerator as claimed in claim 6, wherein the hook is parallel to a top surface of the port support.

8. The valve for a refrigerator as claimed in claim 7, wherein the hook shaped wire stopper bends slightly when the catching part contacts the wire stopper to prevent damage to the valve.

* * * * *